Feb. 19, 1924.

J. E. TROJAN 1,484,588

DEMOUNTABLE RIM

Filed Sept. 28, 1921     2 Sheets-Sheet 2

Inventor
Joseph E. Trojan

By
Attorney

Patented Feb. 19, 1924.

1,484,588

UNITED STATES PATENT OFFICE.

JOSEPH E. TROJAN, OF COLUMBUS, TEXAS.

DEMOUNTABLE RIM.

Application filed September 28, 1921. Serial No. 503,758.

*To all whom it may concern:*

Be it known that I, JOSEPH E. TROJAN, a citizen of the United States, residing at Columbus, in the county of Colorado and State of Texas, have invented new and useful Improvements in Demountable Rims, of which the following is a specification.

This invention relates to demountable rims for the wheels of motor vehicles and has for one of its objects to provide a means for attaching pneumatic tires to vehicle wheels so that they can be easily, readily and quickly mounted thereon and removed therefrom.

Another object of the invention is to provide a sectional and demountable rim in combination whereby pneumatic tires may be placed upon the wheel in fully inflated condition and readily removed from said rim when necessary.

Another object of the invention is to provide a demountable rim which is secured against lateral displacement by being rotated a slight distance circumferentially of the felly upon which it is mounted.

Another object of the invention is to provide a demountable rim which is secured against lateral displacement by partial rotation relative to the felly upon which it is mounted, said rim being provided with antifriction means to facilitate the rotation thereof and to prevent said rim becoming rust bound to the fixed rim which surrounds its felly.

Another object of the invention is to provide a combined demountable and sectional rim having an integral flange and a removable flange portion, the removable flange portion being primarily secured against displacement by rotating it circumferentially of said rim into interlocking engagement with the latter, its stability of position when on the wheel being further reassured by its engagement with an irremovable retaining flange carried by the felly of the wheel.

Another object of the invention is to provide a combined demountable and sectional rim comprising an integral flange on one side thereof and a removable flange portion on the other side spaced apart for the reception of the sides of a tire casing therebetween, said removable flange portion being securable against lateral displacement by rotating it a slight distance circumferentially of said rim and being selectively removable from said rim either by a rotation in a contrary direction or by being expanded radially of said rim.

Another object of the invention is to provide a combined demountable and sectional rim, said rim being mounted upon the felly of a wheel by being telescoped thereupon and secured against lateral displacement by partially rotating it a slight distance circumferentially of said felly, said rim comprising an integral flange on one side thereof and a removable flange portion on the other, said flanges being spaced apart for the reception of the sides of a tire casing therebetween, there being pin and bayonet slot connections between said removable flange portion and rim whereby said members are secured against relative lateral displacement by partial rotation of said removable flange portion circumferentially of said rim, said removable flange portion being also diagonally split at one point to provide means for expanding it radially so as to cause it to ride over the pins in said rim in the event that it should become impossible, due to rusting of the parts, to rotate said flange portion so as to remove it through said bayonet slots.

Another object of the invention is to provide a demountable rim for carrying a pneumatic tire which is secured against lateral displacement by partially rotating it circumferentially relative to the felly upon which it is mounted, said felly having an elongated slot therethrough covering the range of movement through which said demountable rim is rotated, for accommodating the valve stem of the tire and a filler piece engaging said valve stem and closing the inner end of said elongated slot.

Other objects will appear as the description proceeds.

The invention will first be hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figures 3, 4, 5 and 6 are views showing details of construction.

Figure 7 is a front and side elevation of the filler piece covering the inner side of the elongated slot through the felly.

Figure 1:
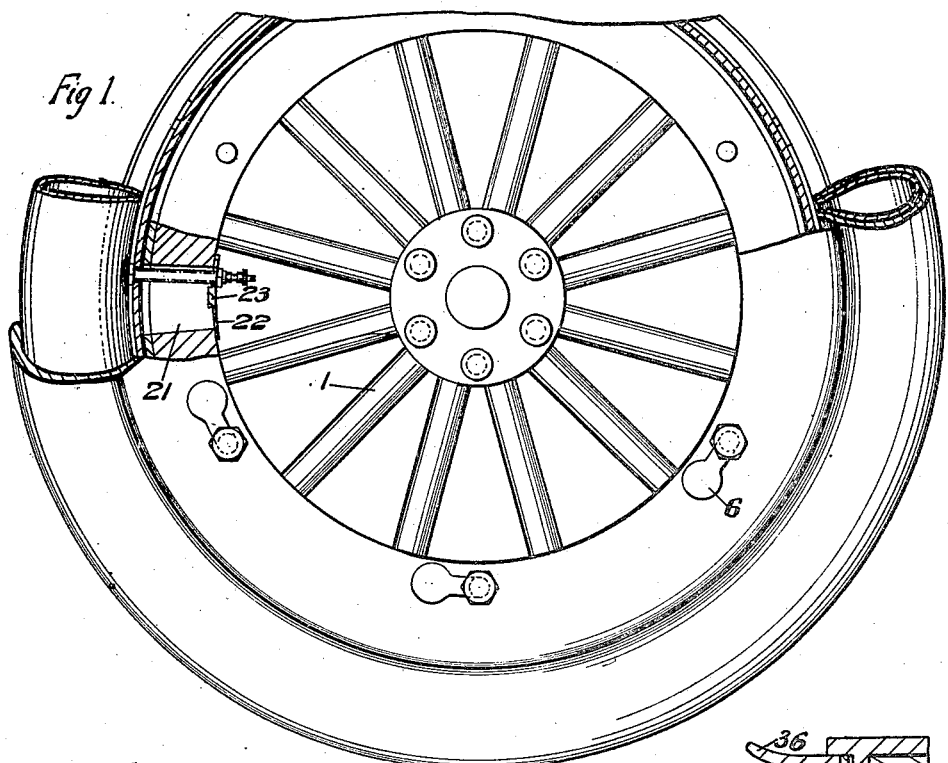
Figure 1 is a side elevation of the wheel of an automobile provided with the device of my invention, parts being broken away to show the detailed construction thereof.
Figure 2:
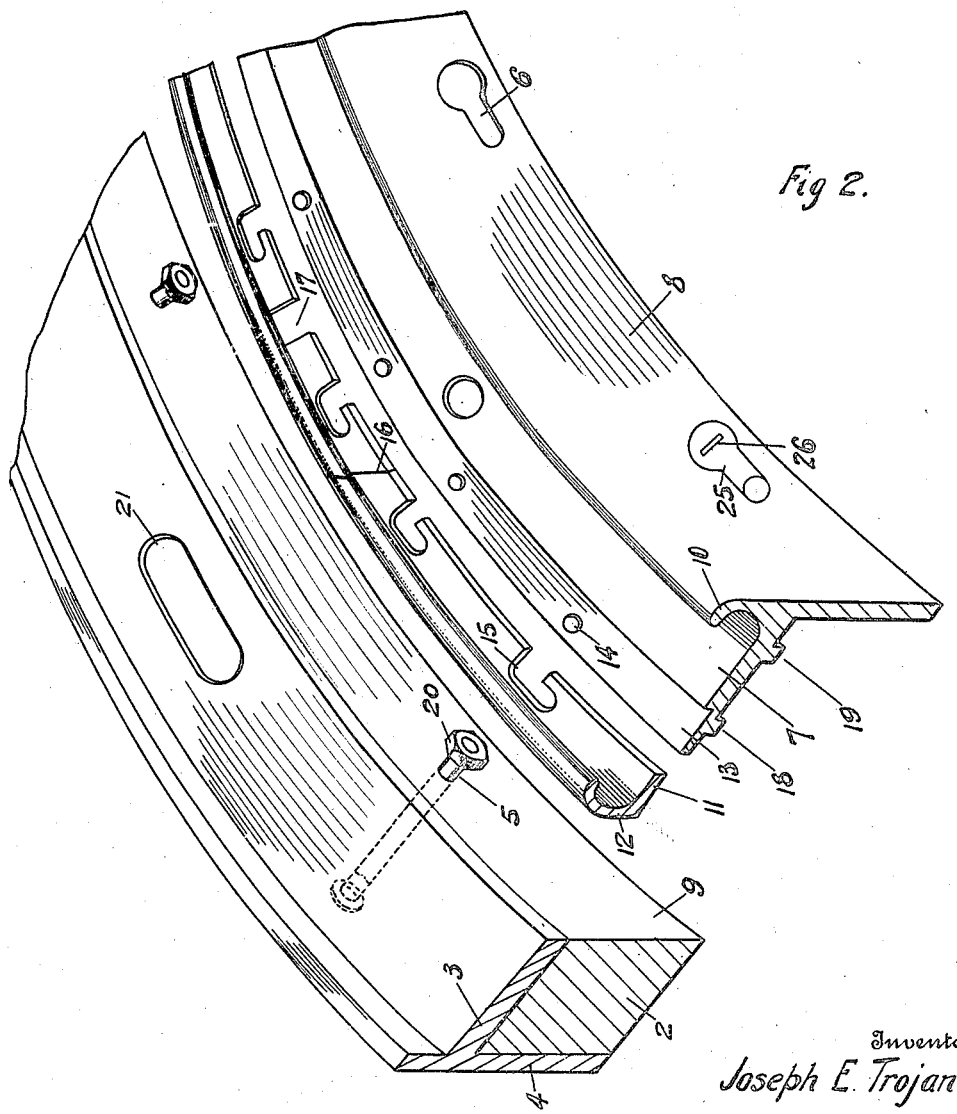
Figure 2 is a perspective view of a section of a felly and my demountable rim, the parts being separated for the purpose of clearly showing the construction.

In the drawings, numeral 1 represents the wheel of an automobile having the wooden felly 2 shod with an iron rim 3 having a cylindrical portion extending therearound and provided at the rear with a flange 4 extending inwardly for a distance equal to the depth of the felly and outwardly for a sufficient distance to form a circumferential abutment to limit the inner movement of the rim when the latter is placed upon the wheel and preventing the separation of the sectional parts of said rim when the latter is in place. As is usual in demountable rim construction the rim 3 tapers slightly toward the outside of the felly to facilitate the lateral positioning of the demountable rim thereon. The flange 4 and the felly 2 are apertured at equidistant intervals around the wheel for the reception of bolts 5 which project from the outer surface of the wood felly 2 a sufficient distance to pass through the key-hole slots 6 which are provided in the demountable rim now to be described. These bolts are provided with threaded ends upon which nuts 20 are retained for tightening against the walls of the narrow parts of the key-hole slots.

The demountable rim which is sectional in construction comprises an annular portion 7 having an integral angularly disposed flange 8 adapted to fit against the exposed side 9 of the wood felly and extended outwardly into a tire engaging flange 10 which may be curved inwardly to hold a tire of the clincher type or made substantially straight as shown at 36 in Figure 6 for engaging the walls of a straight-side tire. The annular portion 7 of the demountable rim is cut away or rabbeted on the side remote from the integral flange 10 to provide a seat for the removable flange 11. This flange has a supporting base seated in the rabbeted depression of the demountable rim and an upstanding flange 12 corresponding in shape to that of the flange 10 with which it cooperates in holding the tire. The rabbeted portion 13 is provided at regular intervals with upstanding pins and the base 11 of the flange 12 with bayonet slots engaging around said pins. The base 11 is freely rotatable around the rabbeted portion 13 so that when the removable flange 12 has been laterally positioned with the pins 14 in registry with the open ends of the bayonet slots 15 said removable flange may be turned circumferentially of the rabbeted portion 13 to move the pins into the closed ends of the bayonet slots, in which position the removable flange is held against lateral displacement. The height of the pins 14 is such that they do not project above the upper surface of the base 11 of the removable flange so as to present a smooth seating surface for the casing of the pneumatic tire.

As it is possible that the removable flange 12 may become rusted to the rabbeted portion 13 of the demountable rim when the parts have remained for a long time undisturbed it may be impracticable to rotate said removable flange relative to said rabbeted portion when it is desired to separate the parts for the removal of the tire. Provision is therefore made whereby said removable flange portion may be forced over the pins 14 and removed therefrom without the necessity of rotating it. This is accomplished by an angular cut 16 which extends entirely through the removable flange portion 12 severing it into two separable ends, and a notch 17 cut in the base of said removable flange portion adjacent one of said ends into which a tool may be inserted from the outside and said adjacent end raised so as to spring the same over one of the pins 14. To complete the displacement of said removable flange portion it is only necessary to insert the tool progressively beneath said flange portion adjacent the raised end thereof and expand it above a sufficient number of successive pins to enable it to be removed.

In order to minimize the frictional resistance between the demountable rim and the stationary rim 3 and so to facilitate rotation of the parts ribs 18 and 19 are provided on the under surface of the demountable rim running longitudinally thereof and presenting a very small surface in contact with the surface of the rim 3. This also prevents the demountable rim from becoming inseparably rusted to the fixed rim. As the rim 3 tapers toward the outside it follows as a matter of course that the rib 19 will be higher than the rib 18. Should undue resistance be encountered in attempting to rotate the demountable rim relative to the felly it is only necessary to slightly tap said demountable rim laterally in a direction from the rear which will break the wedge like hold assumed by the tapered parts permitting thereafter free rotation of the same. When the demountable rim has been rotated until the bolts 5 are within the narrowed portions of the key-hole slots 6 the nuts 20 are tightened securing the parts together. To remove the demountable rim it is not necessary to entirely remove the nuts from the bolts. It is sufficient that they be loosened and the rim turned until said nuts are in registry with the enlarged portions of the key-hole slots which are of sufficient size to accommodate them.

In order to allow for movement of the valve stem of the tire when the demountable rim is partially rotated, the felly 2 and rim 3 are provided with the elongated slot 21, covering the range of movement of the demountable rim, through which the stem of the valve projects inwardly. The inner end of the slot 21 as shown in Figure 1 is closed by a filler piece 22 having an inwardly extending rectangular boss 23 acting as a guide for said filler piece and an aperture 24 through which the valve stem projects. The usual nut found on the valve stem is screwed down against the filler piece as clearly shown in Figure 1, holding it in place.

In placing the inflated tire on the sectional rim the removable flange portion is first taken off and the tire slipped in place. The removable flange portion is pushed laterally into place on the rabbeted side of the demountable rim, with the open ends of the bayonet slots in registry with the pins 14. It is then turned so that the pins enter the closed ends of the bayonet slots. This holds the removable flange portion in place so that the tire can be inflated. In placing the demountable rim on the wheel it is so positioned that the removable flange portion is adjacent the retaining flange of the fixed rim 3 and it is forced thereagainst by screwing up the nuts 20 into contact with the flange 8. This ensures against accidental displacement of the removable flange portion during the operation of the vehicle.

To forestall the possibility of the demountable rim shifting circumferentially relative to the fixed rim, a filler piece 25 is placed in one of the keyhole slots 6 with the concave end thereof in contact with the side of the bolt. A slot 26 in the filler piece provides means for the withdrawal of the latter when the rim is to be demounted.

While I have above described what I have found to be a very practical embodiment of my invention, it is nevertheless to be understood that the demountable rims may also be exemplified in numerous other alternative constructions and I accordingly reserve the right of adopting all such legitimate changes as may be fairly embodied within the spirit and scope of the invention as claimed.

Having described my invention what I claim as new and desire to secure by Letters Patent, is:—

1. In a demountable rim construction for automobile wheels, a felly, a stationary rim on said felly, a demountable rim on said stationary rim, means cooperating with said demountable rim when the latter is slightly rotated on said stationary rim for securing said demountable rim against lateral displacement one of said rims being formed with a plurality of longitudinal ribs, partially spacing said stationary and demountable rims to facilitate said partial rotation.

2. In a demountable rim construction for automobile wheels, a felly, a stationary rim on said felly, a demountable rim on said stationary rim formed with a rabbeted inner edge providing a seat for a removable tire retaining flange, means cooperating with said demountable rim when the latter is slightly rotated on said stationary rim for securing said demountable rim against lateral displacement one of said rims being formed with a longitudinal rib arranged beneath said rabbeted edge and partially spacing said stationary and demountable rims to facilitate said partial rotation.

3. In a demountable rim construction for automobile wheels, a felly, a tapered stationary rim on said felly having a downwardly extending flange engaging one side of said felly and an upwardly extending retaining flange, a tapered demountable rim telescoping upon said stationary rim and having a downwardly extending flange engaging the other side of said felly, said flange being provided at intervals with key-hole slots, bolts passing through the downwardly extending flange of said stationary rim and through said key-hole slots, said slots being provided with nuts freely passable through the enlarged portions of said key-hole slots and overlying the walls of the narrow portion of said key-hole slots when said demountable rim is partially rotated, one of said rims being provided with longitudinal ribs engaging the adjacent surface of the other of said rims, said ribs being of unequal height to fit the taper of said rims, said nuts being tightened to force said demountable rim into contact with the retaining flange of said fixed rim.

In testimony whereof I have hereunto set my hand in presence of two subscribing witnesses.

JOSEPH E. TROJAN.

Witnesses:
W. H MIEKOW,
H. BRADEN.